US008096648B2

(12) United States Patent
Jones

(10) Patent No.: US 8,096,648 B2
(45) Date of Patent: Jan. 17, 2012

(54) INK MELT DEVICE WITH SOLID STATE RETENTION AND MOLTEN INK PASS-THROUGH

(75) Inventor: Brent Rodney Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 471 days.

(21) Appl. No.: 12/362,579

(22) Filed: Jan. 30, 2009

(65) Prior Publication Data

US 2010/0194834 A1 Aug. 5, 2010

(51) Int. Cl.
*B41J 2/175* (2006.01)
*G01D 11/00* (2006.01)

(52) U.S. Cl. ........................................... 347/88; 347/99

(58) Field of Classification Search .................... 347/88, 347/99
See application file for complete search history.

(56) References Cited

U.S. PATENT DOCUMENTS

| | | | | |
|---|---|---|---|---|
| 4,771,920 | A | 9/1988 | Buccagno et al. | |
| 5,657,904 | A | 8/1997 | Frates et al. | |
| 6,175,101 | B1 | 1/2001 | Miller et al. | |
| 7,210,773 | B2 | 5/2007 | Jones | |
| 2004/0114007 | A1 * | 6/2004 | Leighton | 347/88 |
| 2004/0114008 | A1 * | 6/2004 | Leighton et al. | 347/88 |
| 2004/0114010 | A1 * | 6/2004 | Leighton et al. | 347/88 |

* cited by examiner

*Primary Examiner* — Geoffrey Mruk
(74) *Attorney, Agent, or Firm* — Maginot, Moore & Beck, LLP

(57) ABSTRACT

A phase change ink melting assembly for use in a phase change ink imaging device includes an ink melt perimetric constraint having an open top and a melted ink egress positioned at a bottom of the perimetric constraint. The open top is sized to receive a leading end of an ink stick fed downwardly therethrough. The perimetric constraint includes an interior through path with egress at the bottom and a plurality of melted ink flow paths intermediate the open top and the melted ink egress. The assembly includes a heater for heating the perimetric constraint to a phase change ink melting temperature.

20 Claims, 9 Drawing Sheets

INK MELT DEVICE WITH SOLID STATE RETENTION AND MOLTEN INK PASS-THROUGH

TECHNICAL FIELD

This disclosure relates generally to phase change ink jet imaging devices, and, in particular, to ink melt assemblies used in such imaging devices.

BACKGROUND

Solid ink or phase change ink printers conventionally use ink in a solid form, either as pellets or as ink sticks of colored cyan, yellow, magenta and black ink, that are inserted into feed channels through openings to the channels. Each of the openings may be constructed to accept sticks of only one particular configuration. After the ink sticks are fed into their corresponding feed channels, they are urged by gravity or a mechanical actuator to a solid ink melting assembly of the printer.

Previously known ink melting assemblies typically included substantially flat, heated melt plates that were oriented at least somewhat vertically. One issue with the use of flat melt plates is the limited surface area of the melt plate that may be contacted by an ink stick which in turn limits the rate at which ink may be melted and supplied to the printheads. Faster print speeds require more ink melt in a given span of time. Phase change ink may be damaged by over heating so simply increasing the temperature generated by the melt plate to increase the melt flow rate may not be practical.

In addition, while the vertical orientation of the plates enabled the melted ink to flow down the plates to a drip point to control the flow of ink, the vertical orientation of the plates necessitated a somewhat horizontal feed path in order to bring solid ink sticks in contact with the plates. Feed paths in some phase change ink imaging devices may be vertical or include vertical feed sections which allow gravity to be the driving force that urges or moves ink along the fed path and into contact with a melt plate. Flat, horizontally oriented melt plates, however, may not be adequate to direct the flow of molten ink in a controlled fashion.

SUMMARY

In order to increase the rate that solid ink is melted in a phase change ink imaging device, a phase change ink handling system has been developed that includes an ink melt perimetric constraint with an open top and multiple surfaces that expose solid ink to a large total heated surface area significantly greater than a flat plate so that ink fed into it can be melted at a high rate. The perimetric constraint includes an interior through path with egress feature at the bottom and a plurality of melted ink flow paths intermediate the open top and the melted ink egress. The assembly includes a heater to heat the perimetric constraint to a phase change ink melting temperature. In one embodiment, flow paths include openings through the perimetric constraint that enable a portion of the melted ink to flow along the exterior. In another embodiment the ink melt perimetric constraint includes a heated perforated ink melt barrier that extends across an internal area of the perimetric constraint between the open top and the melted ink egress and at least a portion of the melted ink flows to the egress through the barrier openings.

In another embodiment, a phase change ink handling system comprises at least one solid ink feed channel having an insertion end and a melt end that is configured to move solid ink sticks from the insertion end to the melt end. The system includes a solid ink melting assembly for each solid ink feed channel. Each solid ink melting assembly includes an ink melt perimetric constraint having an open top, a plurality of melted ink flow paths with melted ink egress positioned at a bottom of the perimetric constraint and a heater for heating the perimetric constraint to a phase change ink melting temperature. A heated reservoir is placed below the perimetric constraint to receive ink flow from the egress.

In yet another embodiment, a phase change ink imaging device is provided that includes a plurality of solid ink feed channels. Each feed channel in the plurality is configured to move ink sticks toward a melt end of the feed channel. The imaging device includes a solid ink melting assembly for each solid ink feed channel in the plurality. Each solid ink melting assembly includes an ink melt perimetric constraint having an open top, a plurality of melted ink flow paths with melted ink egress positioned at a bottom of the perimetric constraint, and a heater for heating the perimetric constraint to a phase change ink melting temperature. The imaging device includes a reservoir for each ink melting assembly. Each reservoir is configured to receive melted ink via the melted ink egress of one of the ink melting assemblies. The reservoir includes a heater for heating the reservoir to the phase change ink melting temperature. The imaging device also includes at least one printhead configured to receive melted ink from at least one of the reservoirs and to eject melted phase change ink onto an imaging surface.

BRIEF DESCRIPTION OF THE DRAWINGS

The foregoing aspects and other features of the present disclosure are explained in the following description, taken in connection with the accompanying drawings, wherein.

DETAILED DESCRIPTION

Figure 1:
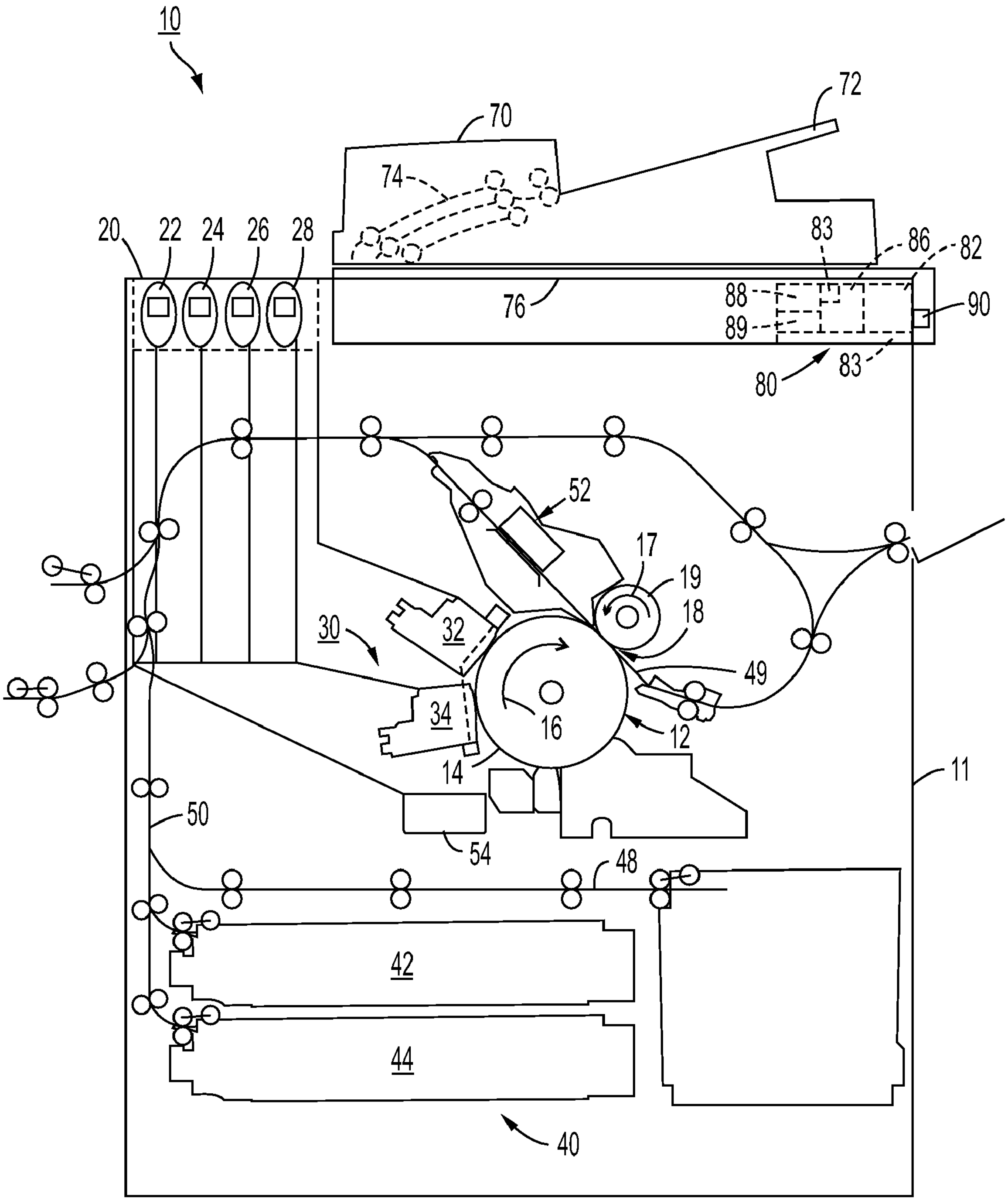
FIG. 1 is block diagram of a phase change ink image producing machine.

For a general understanding of the present embodiments, reference is made to the drawings. In the drawings, like reference numerals have been used throughout to designate like elements.

As used herein, the terms "printer" or "imaging device" generally refer to a device for applying an image to print media and may encompass any apparatus, such as a digital copier, bookmaking machine, facsimile machine, multi-function machine, etc. which performs a print outputting function for any purpose. "Print media" can be a physical sheet of paper, plastic, or other suitable physical print media substrate for images, whether precut or web fed. The imaging device may include a variety of other components, such as finishers, paper feeders, and the like, and may be embodied as a copier, printer, or a multifunction machine. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the marking engine and may include text, graphics, pictures, and the like. Terms like ink handling system, ink loader and loader, with respect to an ink delivery system, are synonymous and may be used interchangeably.

Referring now to FIG. 1, an embodiment of an imaging device, such as a high-speed phase change ink imaging device 10 of the present disclosure, is depicted. As illustrated, the device 10 includes a frame 11 to which are mounted directly or indirectly all its operating subsystems and components, as described below. To start, the high-speed phase change ink imaging device 10 includes an imaging member 12 that is shown in the form of a drum, but can equally be in the form of a supported endless belt. The imaging member 12 has an imaging surface 14 that is movable in the direction 16, and on which phase change ink images are formed. A heated transfix roller 19 rotatable in the direction 17 is loaded against the surface 14 of drum 12 to form a transfix nip 18, within which ink images formed on the surface 14 are transfixed onto a heated copy sheet 49.

The device 10 includes a phase change ink loader 20 that is configured to receive phase change ink in solid form, referred to herein as solid ink or solid ink sticks. The ink loader 20 also includes a phase change ink melting assembly (FIG. 4) for melting or phase changing the solid form of the phase change ink into a liquid form. Phase change ink is typically solid at room temperature. The ink melting assembly is configured to heat the phase change ink to a melting temperature selected to phase change or melt the solid ink to its liquid or melted form. Currently, common phase change inks are typically heated to about 100° C. to 140° C. to melt the solid ink for delivery to the printhead(s). Thereafter, the phase change ink handling system is configured to communicate the molten phase change ink to a printhead system including one or more printheads, such as printhead 32 and 34 depicted in FIG. 1. Any suitable number of printheads or printhead assemblies may be employed.

As further shown, the phase change ink image producing machine or printer 10 includes a substrate supply and handling system 40. The substrate supply and handling system 40, for example, may include sheet or substrate supply sources 42, 44, 46, 48, of which supply source 48, for example, is a high capacity paper supply or feeder for storing and supplying image receiving substrates in the form of cut sheets 49, for example. The substrate supply and handling system 40 also includes a substrate or sheet heater or preheater assembly 52. The phase change ink image producing machine or printer 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example, may be a self-contained, dedicated mini-computer having a central processor unit (CPU) 82, electronic storage 84, and a display or user interface (UI) 86. The ESS or controller 80 for example includes sensor input and control 88 as well as a pixel placement and control 89. In addition the CPU 82 reads, captures, prepares and manages the image data flow between image input sources such as the scanning system 76, or an online or a work station connection 90, and the printhead assemblies 32, 34, 36, 38. As such, the ESS or controller 80 is the main multi-tasking processor for operating and controlling the machine subsystems and functions.

Figure 2:
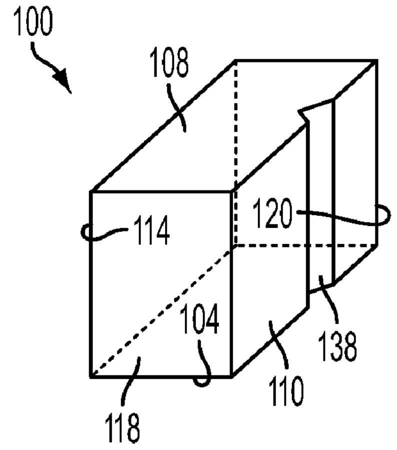
FIG. 2 is a perspective view of an embodiment of a solid ink stick for use with the image producing machine of FIG. 1.

As illustrated, the device 10 is a multicolor imaging device includes a phase change ink handling system 20 configured for use with multiple different colors of solid ink, typically cyan, magenta, yellow, and black (CMYK). The device 10, however, may be configured to use more or fewer different colors or shades of ink. One exemplary solid ink stick 100 for use in the phase change ink handling system is illustrated in FIG. 2. The exemplary ink stick 100 has a bottom surface 104 and a top surface 108. The particular bottom surface 104 and top surface 108 illustrated are substantially parallel one another, although they can take on other contours and relative relationships. Moreover, the surfaces of the ink stick body need not be flat, nor need they be parallel or perpendicular one another. The ink stick body also has a plurality of side extremities, such as lateral side surfaces 110, 114 and end surfaces 118,120. The side surfaces 110 and 114 are generally substantially parallel one another, and are substantially perpendicular to the top and bottom surfaces 108, 104. The end surfaces 118, 120 are also substantially parallel one another, and substantially perpendicular to the top and bottom surfaces, and to the lateral side surfaces. One of the end surfaces 11 8 is a leading end surface, and the other end surface 120 is a trailing end surface. The ink stick body may be formed by pour molding, injection molding, compression molding, or other known techniques and may be of any configuration including those that deviate from the described example.

Figure 3:
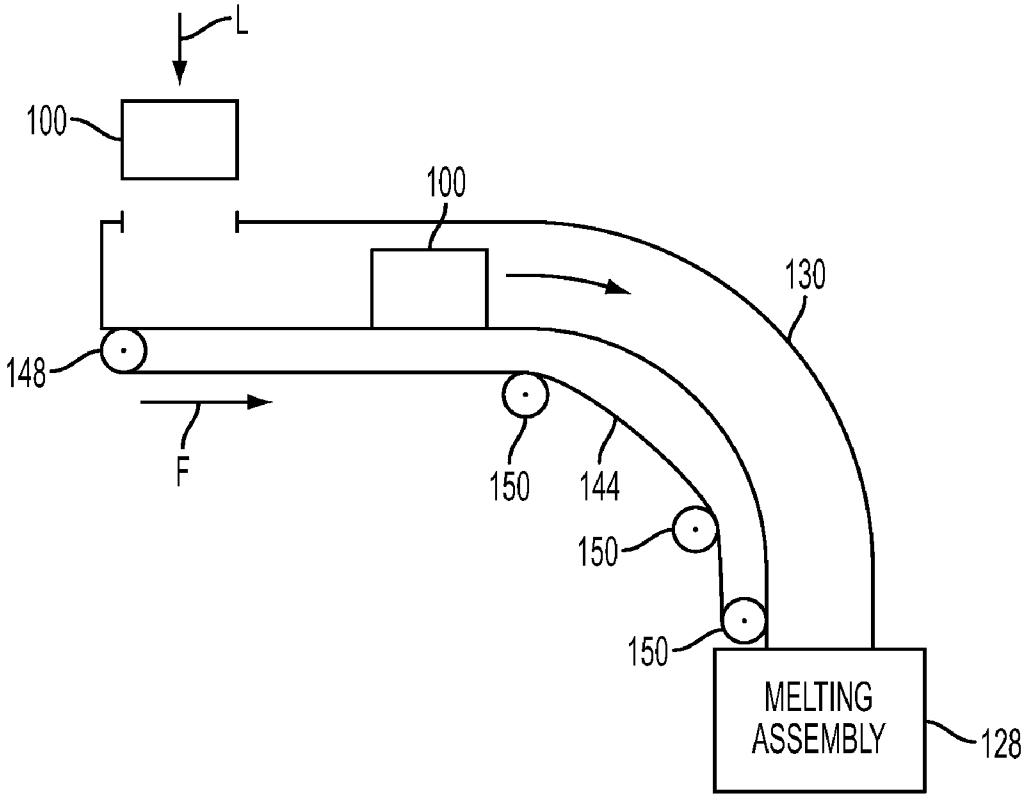
FIG. 3 is a schematic diagram of a phase change ink handling system for use in the imaging device of claim 1.

Referring to FIG. 3, the ink loader 20 includes a plurality of channels, or chutes, such as channel 130, for advancing solid ink sticks 100 to a melting assembly 128. Although a single channel 130 is depicted in FIG. 3, a separate channel is utilized for each of the four colors of ink, CMYK. The ink loader includes insertion openings 134 that provide access to the feed channels 58. The feed channels receive ink sticks inserted through the openings 134 in an insertion direction L. In the embodiment of FIG. 3, the insertion direction L is substantially vertical, i.e., parallel to the direction of gravitational force. The feed channels are configured to transport ink sticks in a feed direction F from the loading station to the melting station. In the embodiment of FIG. 3, the insertion and feed directions L, F are different. For example, ink sticks may be inserted in the vertical insertion direction L and then moved in a horizontally oriented feed direction F, at least initially. In an alternative embodiment, the feed channels and openings may be oriented such that the insertion and feed directions L, F are substantially parallel.

To aid in the correct insertion of ink sticks into the feed channels, ink sticks may be provided with key contours. Key contours may comprise surface features formed into the ink stick such as protrusions and/or indentations that are located in different positions on an ink stick for interacting with complementarily shaped and positioned key elements in the insertion openings of the printer. As an example, the ink stick of FIG. 2 includes an insertion key contour 138. The insertion key contour 138 is configured to interact with keyed insertion openings 134 (FIG. 4) of the ink loader to admit or block insertion of the ink sticks through the insertion opening 134. In the ink stick embodiment of FIG. 2, the key contour 138 is a vertical recess or notch formed in side surface 110 of the ink stick body substantially parallel to the insertion direction L of the ink loader. A complementarily shaped key element (140, FIG. 4) is included on the perimeter of the keyed openings 134. Key contours and corresponding key elements, however, may have any suitable shape including rounded, angled, stepped, etc. In the referenced illustrations, the insertion opening key contour 140 and complementary key contour 138 of the ink stick are nearly identical for ease of visualization but the shapes need not match to accomplish the keying function.

Figure 4:
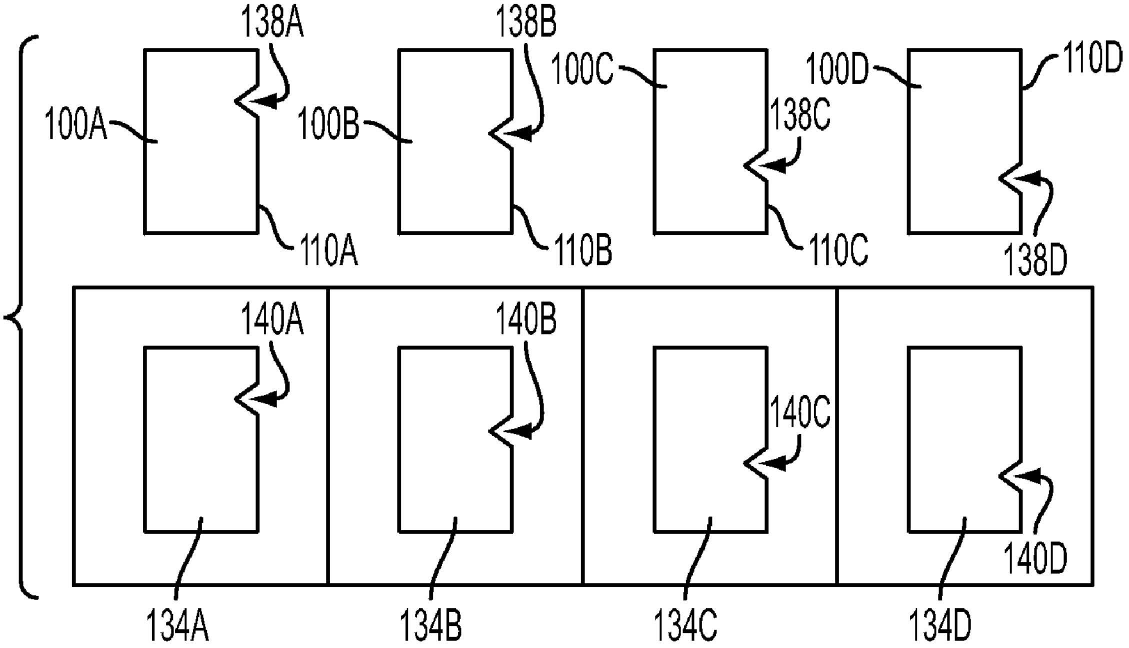
FIG. 4 is a top view of a set of ink sticks having key contours and complementarily keyed insertion openings.

Each color for a printer may have a unique arrangement of one or more key elements in the outer perimeter of the ink stick to form a unique cross-sectional shape for that particular color ink stick. The combination of the keyed openings in the key plate and the keyed shapes of the ink sticks insure that only ink sticks of the proper color are inserted into each feed channel. A set of ink sticks is formed of an ink stick of each color, with a unique key feature arrangement for ink sticks of each color. FIG. 4 shows an example of how insertion key contours 138 may be used to differentiate ink sticks of different colors. There is a set of multi-color ink sticks 100A-100D depicted in FIG. 4 with each ink stick in the stick being of a different color, e.g. cyan, magenta, yellow, and black. As can be seen, each ink stick in the set includes a color key contour, or element 138A-D. The key contours 138A-D are of substantially the same size and shape as one another, but are in different positions along the insertion perimeter of the ink sticks 100A-100D. In this embodiment, the color key contour 138A-D is positioned along the same lateral side surface 110A-D on each ink stick in the set although the color key contours may be positioned along substantially any surface of each ink stick. In this embodiment, the ink sticks of the set are differentiated from each other by positioning the key contour 138A-D in a different position along the lateral side surface 110A-D for ink stick. Additional shape or size features may be used to differentiate ink sticks for other reasons, such as, printer model, geographic regions of use or ink formulation.

The feed channels have sufficient longitudinal length so that multiple ink sticks may be sequentially positioned in the feed channel. The feed channel 130 for each ink color retains and guides ink sticks 100 so that the sticks progresses along a desired feed path. The feed channels 130 may define any suitable path for delivering ink sticks from the insertion openings 134 to the melting assembly 128. For example, feed channels may be linear and/or non-linear and may be horizontally and/or vertically oriented. In the embodiment of FIG. 3, the feed channel 130 is initially horizontally oriented and is curved downward toward the melting assembly 128 such that ink sticks are fed into the melting assembly in a vertical orientation. The downwardly vertical orientation of the feed channel at the melt end allows gravity to provide the primary (or additional) force for transporting ink sticks toward the melting assembly 128. An arcuate portion of the feed path may be short or may be a substantial portion of the path length. The full length of the chute may be arcuate and may consist of different or variable radii. A linear portion of the feed path may likewise be short or a substantial portion of the path length.

As depicted in FIG. 3, feed channel 130 may include a drive member 144 for moving one or more ink sticks 100 along the feed path in the respective feed channel 130. A separate drive member 144 may be provided for each feed channel. The drive member 64 may have any suitable size and shape. The drive member 64 may be used to transport the ink over all or a portion of the feed path and may provide support or guidance to the ink and may be the primary ink guide over all or a portion of the feed path. In the embodiment of FIG. 3, the drive member 144 comprises a belt that extends along a substantial portion of the path of the feed channel 130. The belt 144 may, as shown in FIG. 3, have a planar or circular cross-section and may be held taut by a pair of spaced apart pulleys in the form of a drive pulley 148 and one or more idle pulleys 150. The drive pulley 148 may be rotated by any suitable device such as, for example, by a motor assembly (not shown). The motor may be bidirectional for moving ink sticks 100 forward and backward along the feed path.

The melting assembly 128 is configured to receive solid ink from the feed channels, to melt the solid ink, and to communicate the melted ink to one or more printheads of the printhead system 110. Previously known ink melting assemblies typically included substantially flat, heated melt plates that were oriented at least somewhat vertically. One issue with the use of flat melt plates is the limited surface area of the melt plate that may be contacted by an ink stick which in turn limits the rate at which ink may be melted and supplied to the printheads. Faster print speeds require more ink melt in a given span of time. Phase change ink may be damaged by over heating so simply increasing the temperature generated by the melt plate to increase the melt flow rate may not be practical. In addition, while the vertical orientation of the plates enabled the melted ink to flow down the plates to a drip point to control the flow of ink, the vertical orientation of the plates necessitated a somewhat horizontal feed path in order to bring solid ink sticks in contact with the plates. Feed paths in some phase change ink imaging devices may include vertical feed sections which allow gravity to be the driving force that urges or moves ink along the fed path and into contact with a melt plate. Flat, horizontally oriented melt plates, however, may not be adequate to direct the flow of molten ink in a controlled fashion.

Accordingly, as an alternative to the use of flat, vertically oriented plates for melting solid ink, the present disclosure is directed to a melting assembly that includes an ink melter that includes one or multiple surfaces that expose solid ink to a large total heated surface area significantly greater than a flat plate so that ink fed into it can be melted at a high rate. The melter or perimetric constraint, confines the solid ink during the melt process but does not fully enclose the ink as pass through occurs and instead provides holes, slots, or gaps (as explained below) allowing passage of molten ink beginning at or near the top of the melter and extending over all or a substantial length of the perimetric constraint. The Perimetric Constraint may be circular, somewhat circular or ovoid or it may be multi-faceted, such as square or rectangle. The general shape tapers from a larger open top to a smaller region culminating in an ink egress feature. All variations of the perimetric constraint configuration establish a plurality of melted ink flow paths directed to the egress. The plurality of flow paths includes interior surfaces and at least one of exterior surfaces via openings or perforations through sides and/or corners, and drip or flow points intermediate the interior periphery from a perforated melt barrier. Flow along the exterior is enabled by ink material attraction to the surface and/or edges of the perimetric constraint configured at angles complementary to ensuring flow exit at the egress. Successful flow control along external surfaces has been achieved with angles at and even greater than 60° relative to vertical.

The benefit of a plurality of flow paths is that molten ink is more readily displaced away from the interface of ink in the solid state and the melting surface(s) it impinges upon, thereby reducing the insulating effect that a molten film presents. The molten ink material temperature in the film between the solid ink and the melting surface is a gradient ranging from at or below the heated surface temperature to a temperature near the melting point of the ink. The quicker melted ink is displaced to a flow path outboard of the melt interface the thinner the film will be. The thinner film allows the nominal temperature of molten ink in this region to be nearer the temperature of the heated melt surface(s), thereby increasing melt rate.

Figure 5:
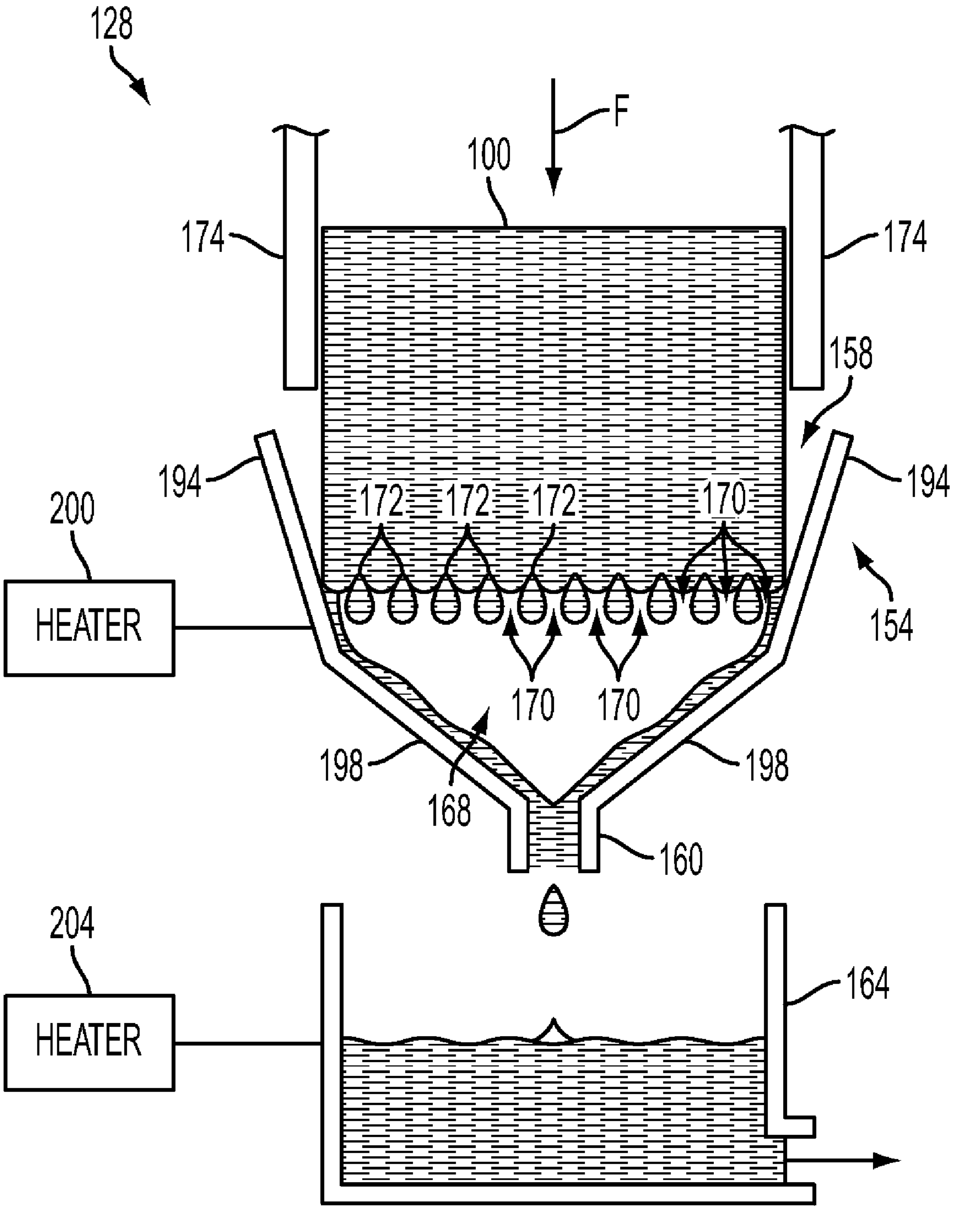
FIG. 5 is a schematic diagram of a phase change ink melting assembly including a perimetric constraint and a reservoir for use with the imaging device of FIG. 1.

Referring now to FIG. 5, an embodiment of a perimetric constraint is illustrated. As depicted in FIG. 5, the melting assembly 128 includes an thermally conductive ink melt perimetric constraint 154 formed by one or multiple vertically oriented side wall(s) that at least partially enclose an internal melting area that is configured to expose a solid ink stick 100 received therein to a much greater surface area than is generally possible using a flat heated plate. The perimetric constraint 154 has an open top 158 sized to receive solid ink sticks fed downwardly therethrough and at least one melted ink egress 160 positioned at the bottom of the perimetric constraint 154 through which melted ink is directed to a melted ink reservoir 164. Positioned in the perimetric constraint between the open top and the melted ink egress(s) is a solid ink barrier 168. The solid ink barrier 168 extends horizontally across the internal area of the perimetric constraint 154 to contact and block the passage of solid ink, i.e., unmelted ink, and functions to increase the melting surface area in the perimetric constraint 154 to which the solid ink is exposed after being fed into the perimetric constraint. In addition, the solid ink barrier 168 includes a plurality of openings 170, such as perforations, gaps, slots, spaces, or the like, that allow melted ink to pass beyond the solid ink barrier 168 to the melted ink egress 160.

In the embodiment of FIG. 5, the ink stick is fed into the perimetric constraint via the open top 158 in a feed direction F that is complementary to the direction of gravitational force. At least one constraining surface 174 may be positioned with respect to the open top 158 of the perimetric constraint to prevent movement of the ink stick in directions other than the feed direction F (and possibly in the direction opposite to direction F). Constraining surfaces 174 are thermally isolated from the ink melt perimetric constraint so that the constraining surfaces may contact and guide the movement of the ink stick without melting the ink stick. The constraining surfaces 174 may be integral with and form the melt end of the associated feed channel. Constraining surfaces, however, may be independent of the associated feed channel. Constraining surfaces may not be required to attain optimal melt performance if the geometry and size of the perimetric constraint is sufficiently accommodating of the ink stick, such as by being larger or by extending above the upper end of an impinging ink stick or in other ways, such as angles that are tolerant of imperfect leaning or movement during the melt process. Constraining surfaces not coupled to the perimetric constraint may thus be beneficial in some cases but not necessary in others.

Figure 7A:
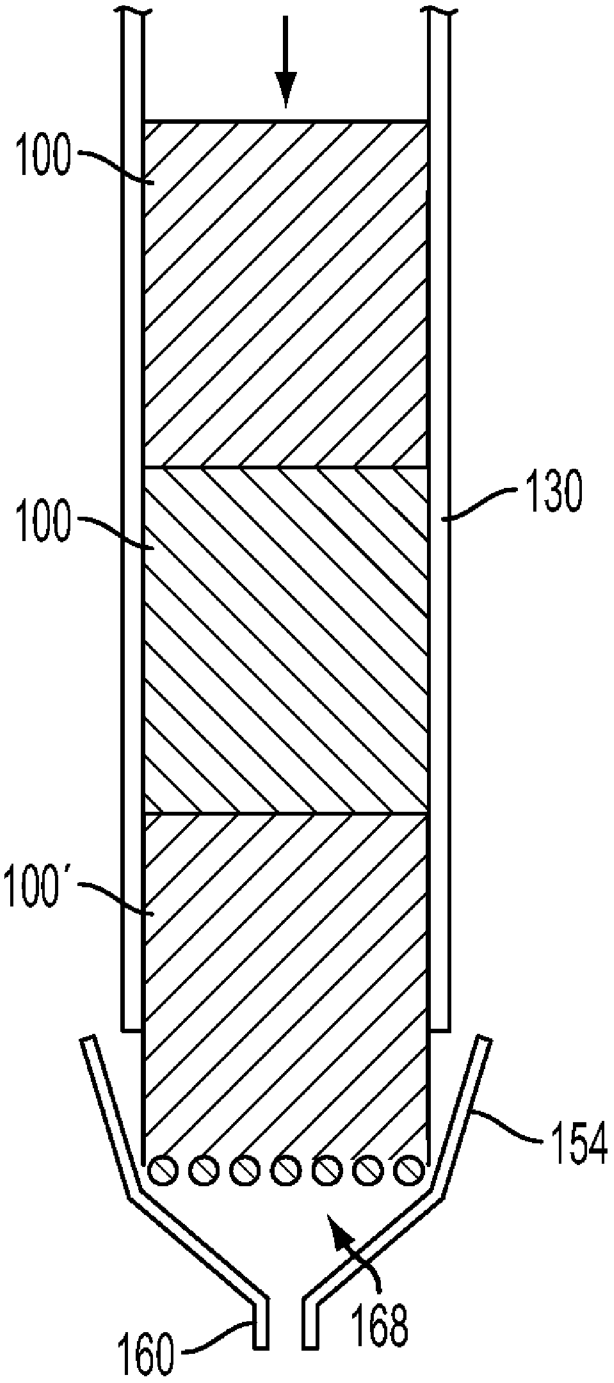
FIG. 7A is a schematic diagram showing the ink melting assembly of FIG. 5 associated with a vertically oriented feed channel section.
Figure 7B:
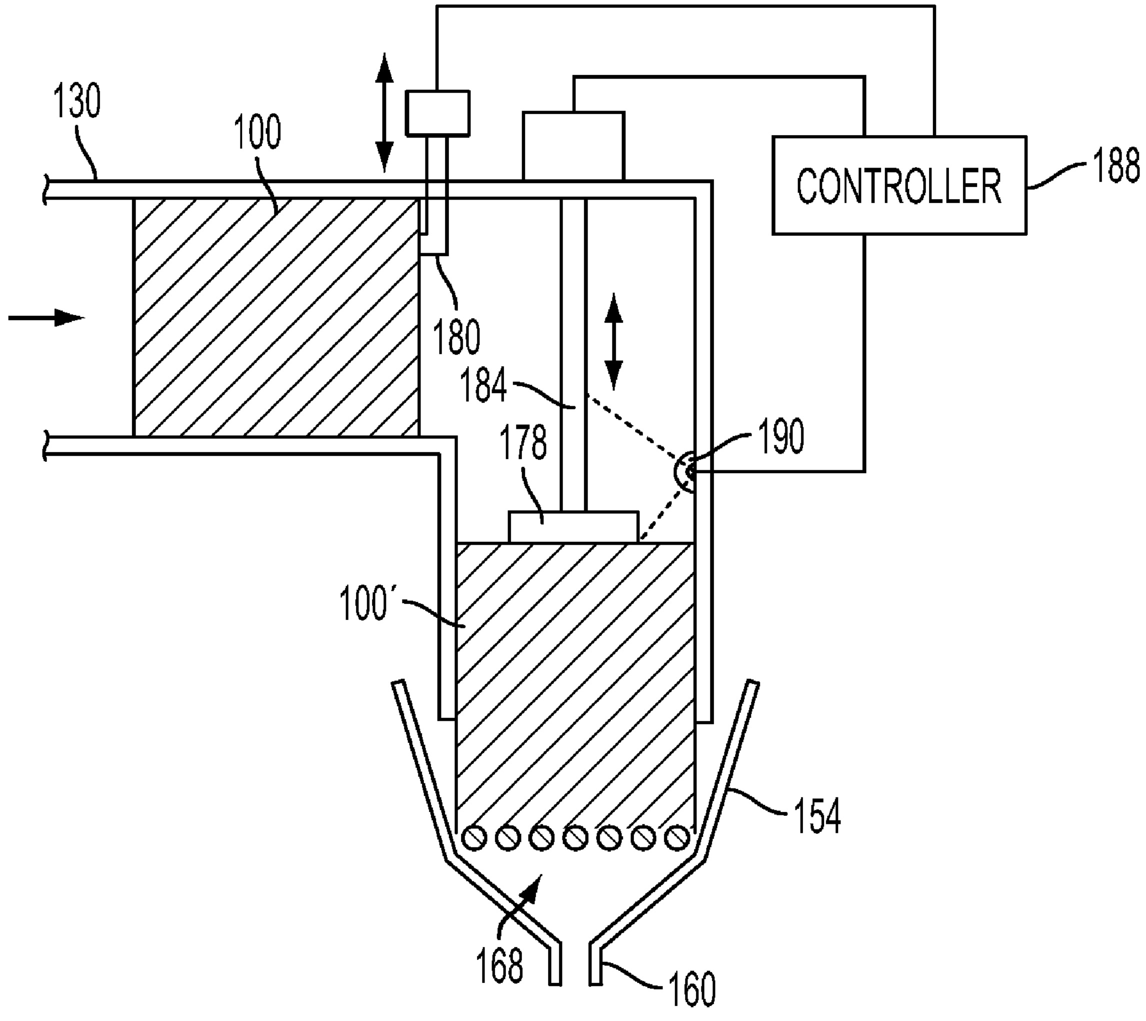
FIG. 7B is a schematic diagram showing the ink melting assembly of FIG. 5 associated with a horizontally oriented feed channel section.

The compliance force for bringing the ink stick into contact may be provided solely by the weight of the ink stick. Additional force may be provided by using a mechanical press device or simply a vertically oriented feed channel section to direct ink sticks to the perimetric constraint as depicted in FIG. 7A. As depicted in FIG. 7A, the vertical orientation of the feed channel 130 allows subsequently inserted ink sticks 100 to stack on top of the lead ink stick 100' and press the ink stick 100' against the solid ink barrier 168. In this case, as the stack height lessens the force also lessens. FIG. 7B shows an embodiment of an ink melt perimetric constraint 154 that is configured to receive ink sticks fed from a horizontally oriented feed section 130. As depicted in FIG. 7B, the feed channel 130 may be equipped with a plunger or press-like device or apparatus 178 that is configured to press against the trailing end of the ink stick 100'. In this embodiment, a retractable barrier 180 may be provided in the feed channel 130 to prevent ink sticks 100 feeding along the horizontal channel from being pushed into the gap 184 over the open top of the perimetric constraint with the plunger extended. A controller 188 may be configured to actuate the retractable barrier 180 and the plunger 178 based on input received from a sensor system 190 that is configured to detect when there is enough space available in the gap 184 above the perimetric constraint to advance another ink stick.

Figure 6:
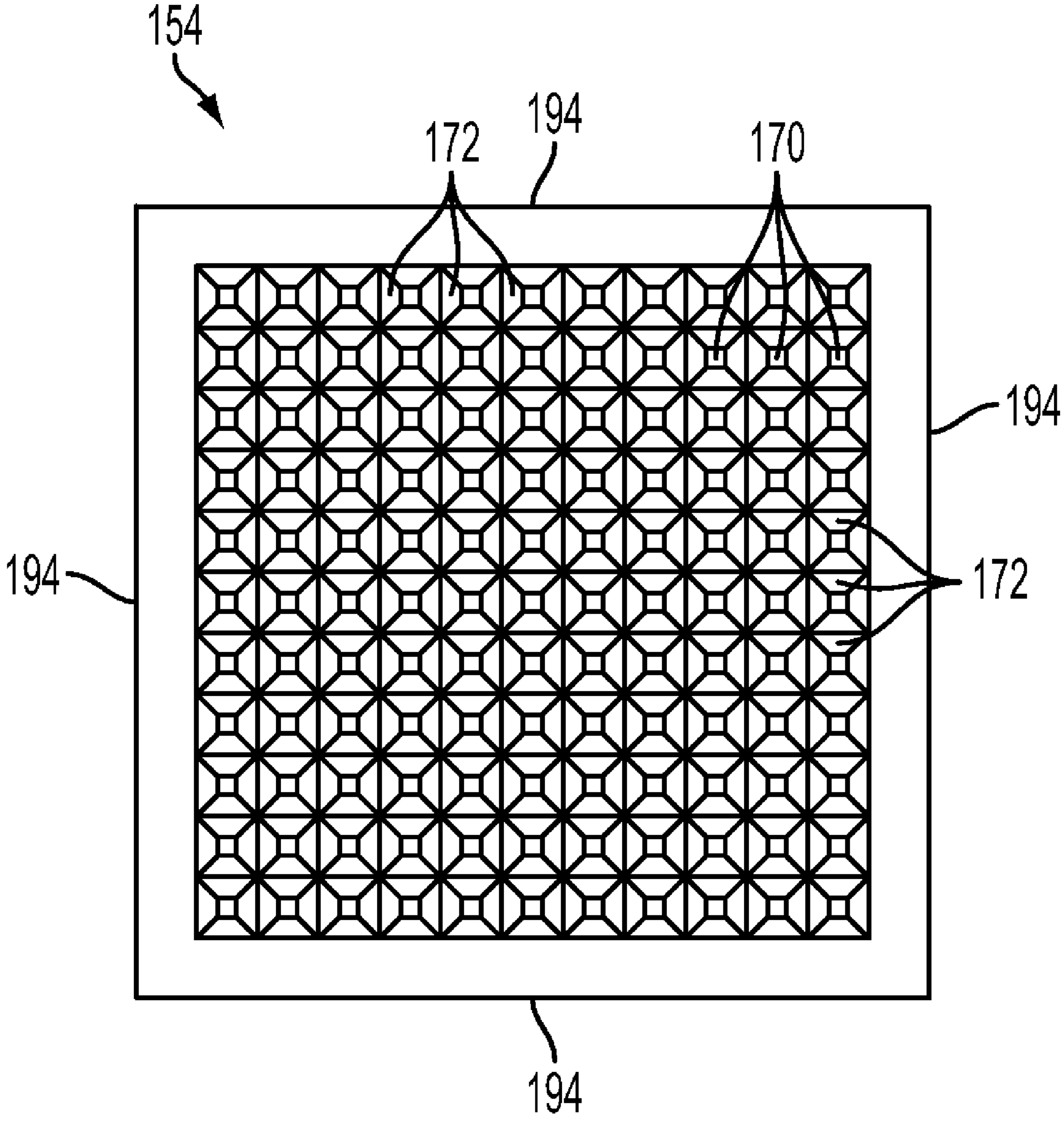
FIG. 6 is a top view of the ink melt perimetric constraint showing the cross-sectional shape of the upper section of an ink melt perimetric constraint of the melting assembly of FIG. 5.

The side walls 194 of the upper section of the perimetric constraint, i.e. the portion of the perimetric constraint above the solid ink barrier that define the open top 158, may be oriented substantially vertically or may be angled or flared outwardly, as from the center of the perimetric constraint depicted in the example of FIG. 5, to facilitate the insertion of an ink stick 100 into the perimetric constraint 154. The side walls 194 of the upper section extend upwardly from the solid ink barrier 168 to form a solid ink melting region that at least partially confines a solid ink stick fed therein and prevents melted ink from escaping the perimetric constraint prior to reaching the melted ink egress. The upper section 194 has a cross-sectional shape in a plane perpendicular to the feed direction F of the ink stick into the perimetric constraint that approximates the nominal cross-sectional shape of the ink stick with which it is intended to be used. For example, as depicted in FIG. 6, the upper section of the perimetric constraint has a square cross-sectional shape that corresponds to the shape of the leading end 118 of the ink stick 100 of FIG. 2. The upper section of the perimetric constraint may be sized so that initial contact between the ink stick and the perimetric constraint is with the solid ink barrier. The walls of the upper section, however, may be at least slightly convergently angled so that the edges of the leading end of the ink stick contact the walls of the upper section and melt as the ink stick progresses into contact with the barrier.

The side walls 198 of the lower section of the perimetric constraint, i.e. the portion of the perimetric constraint below the solid ink barrier, converge to define a melted ink collecting region having at least one melted ink egress 160 through which melted ink may be directed to the reservoir 164. The convergent surface or surfaces leading to the egress may be symmetrical, as shown, or asymmetrical. A single egress 160 is depicted in FIG. 5 for communicating ink to a single reservoir 164. In alternative embodiments, an egress may be configured to communicate ink to multiple reservoirs. Similarly, multiple egress features may be provided that each communicate melted ink to one or more reservoirs. In the embodiment of FIG. 6, the perimetric constraint walls 198 converge at least near the bottom of the melter to define the egress 160 so that ink flow is directed thereto.

As mentioned, the solid ink barrier 168 acts to contact and support an ink stick during the melt process while increasing the melting surface area in the perimetric constraint 154 to which the solid ink is exposed. Multiple melted ink flow paths may be provided by the provision of perforations, slots, gaps, spacings, and the like, through and around the solid ink barrier that allow melted ink to pass beyond the barrier toward the egress while solid ink is retained above the barrier to facilitate the melt process. A solid ink barrier 168 may be positioned at any suitable location between the open top and the egress. Multiple barriers may be utilized in a single perimetric constraint. For example, additional barriers may be placed below the upper barrier 168, such as near the egress, where a barrier or barriers may serve to ensure full melting ink so that ink of any particle does not exit in a solid state.

As depicted in FIGS. 5 and 6, the solid ink barrier 168 may comprise one or more extensions 172, such as plates, ribs, webs, fins, or the like, that extend partially or fully into the internal expanse of the perimetric constraint. Not all stated configurations are illustrated. Ribbed barriers may be arranged in the perimetric constraint in a number of configurations. For example, a barrier may be formed by arranging multiple ribs across the expanse of the perimetric constraint. In the embodiment of FIGS. 5 and 6, ribs 172 extend across the internal area of the perimetric constraint in multiple directions to form an intersecting grid. Ribs may extend from any internal surface of the perimetric constraint at any angle, the function of which may be to improve melt rate and/or influence directional control of the ink stick being melted to minimize jams or facilitate proper feed. As best seen in FIG. 5, barrier ribs 172 may be thinner or tapered at the top where the ink first makes contact and wider at the opposite or bottom end so that ink volume entering the ribbed area is encouraged to substantially or fully melt before progressing beyond the ribbed area.

As an alternative to using one or more rib-like extensions to form the solid ink barrier 168, the solid ink barrier may comprise a metallic plate modified to include melted ink pass through openings 170. The use of a metallic plate may simplify the construction of the barrier as openings, such as slots, gaps, spacings, and the like, may be provided in the plate using conventional sheet metal fabrication techniques. Plate barrier openings or perforations may be in any form, including holes, such as punched holes, slots, such as a lance or grate configuration, or an array of slots or non round holes, such as a grid. The use of perforations allows melted ink pass flow paths to be formed through the barrier and may be incorporated without having to remove material from the barrier, such as by punching or drilling, which otherwise may reduce the surface area of the barrier that may be used to contact and melt solid ink. Non-perforated areas of a plate barrier may be flat or zero degrees relative to the ink stick feed vector or may be at least partially angled from beyond zero up to ninety degrees relative to the ink stick feed vector F. Barrier configures may also be formed of a non metallic material, such as by molding a plastic compound, though for simplicity, the sheet metal example is described.

Figure 8A:
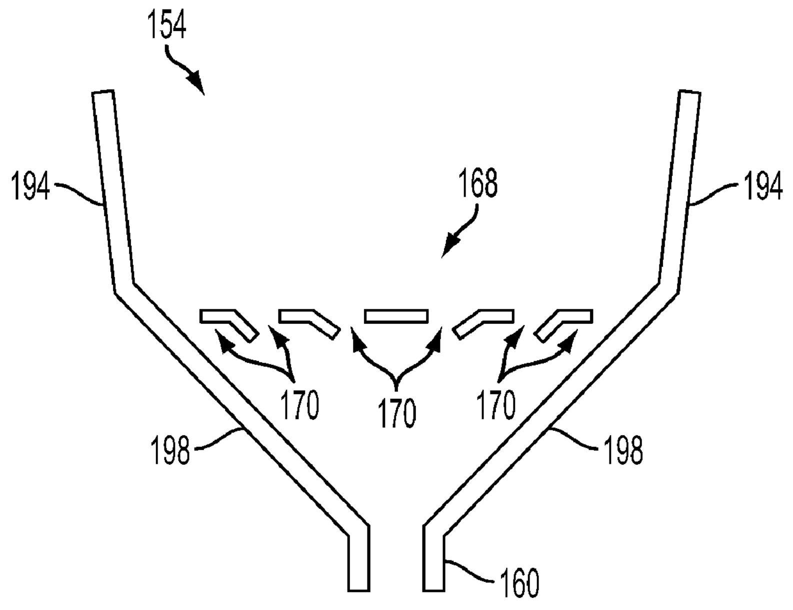
FIG. 8A is a schematic diagram of an ink melt perimetric constraint showing an alternative embodiment of a solid ink barrier arranged in the constraint.
Figure 8B:
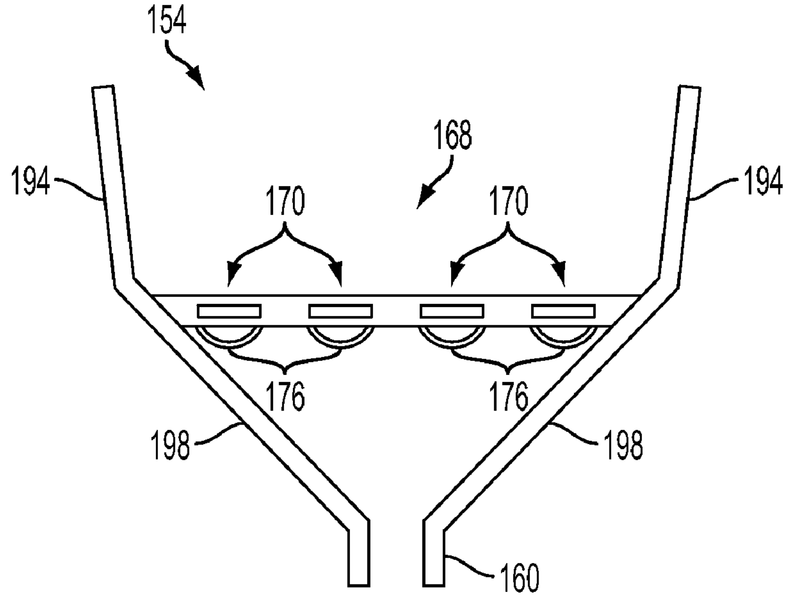
FIG. 8B is a schematic diagram of an ink melt perimetric constraint showing another alternative embodiment of a solid ink barrier arranged in the constraint.

FIGS. 8A and 8B each show a cross-sectional view of an embodiment of a solid ink barrier in the form of a perforated plate where perforations are created without material removal. In FIG. 8A, the barrier comprises a plate 168 provided with a plurality of cut and angle style perforations 170. As used herein, cut and angle style perforations refer to perforations in the form of longitudinal cuts or slits formed in the plate. Plate material along at least one side of a cut 170 is bent or angled downward toward the egress 160 to provide a melted ink pass through opening 170. The resulting structure of a cut and angle style perforation may resemble a louver, for example. FIG. 8B shows another exemplary embodiment of a solid ink plate barrier 168. In the embodiment of FIG. 8B, the plate barrier includes perforations 170 in the form of lance slots. As used herein, a "lance slot" refers to a set of parallel slits formed in a metal plate with the plate material 176 between the parallel slits being pushed through the plate so that the sheared edges of the slot material is below the plate material surrounding the parallel slits. The plate material 176 between the parallel slits thus forms, for example, a substantially U-shaped projection that extends below the planar extent of the plate.

Melted ink flow path openings, such as perforations, slots, gaps, spacings, and the like, within a barrier, walls of the constraint or between a barrier and the perimetric constraint walls may be narrow, 1 mm as example, so molten ink may flow outboard of the melt contact areas but solid ink is retained to facilitate the melt process. Narrow opening widths also ensure that the molten ink adheres to the edges rather than dripping off as it flows downward. The actual slot or gap width that will be most effective may vary and is based in part on geometry, angle, fluidity of the molten ink and flow start up and cessation relative to power control to the heater.

The melted ink flow path openings described above are internal to the perimetric constraint. In another embodiment, the perimetric constraint may be provided with melted ink flow path openings that facilitate flowing a portion of the molten ink from the interior of the perimetric constraint to the exterior. Interior-to-exterior flow path openings may comprise perforations, punched or drilled holes, slits, or the like. Any suitable number and positioning of interior-to-exterior melted ink flow path openings may be provided in a perimetric constraint. Surface tension of the ink and surface energy of the exterior surface of the perimetric constraint allow the melted ink to "adhere" on the exterior surface of the perimetric constraint and flow down the exterior surface of the perimetric constraint toward the egress point. Interior-to-exterior flow paths may be provided in a perimetric constraint in addition to or as an alternative to flow paths provided through and around a solid ink barrier. Thus, a perimetric constraint with interior-to-exterior flow paths does not have to be provided with an internal barrier to attain the desired benefit of multiple flow paths in a perimetric constraint.

Figure 9:
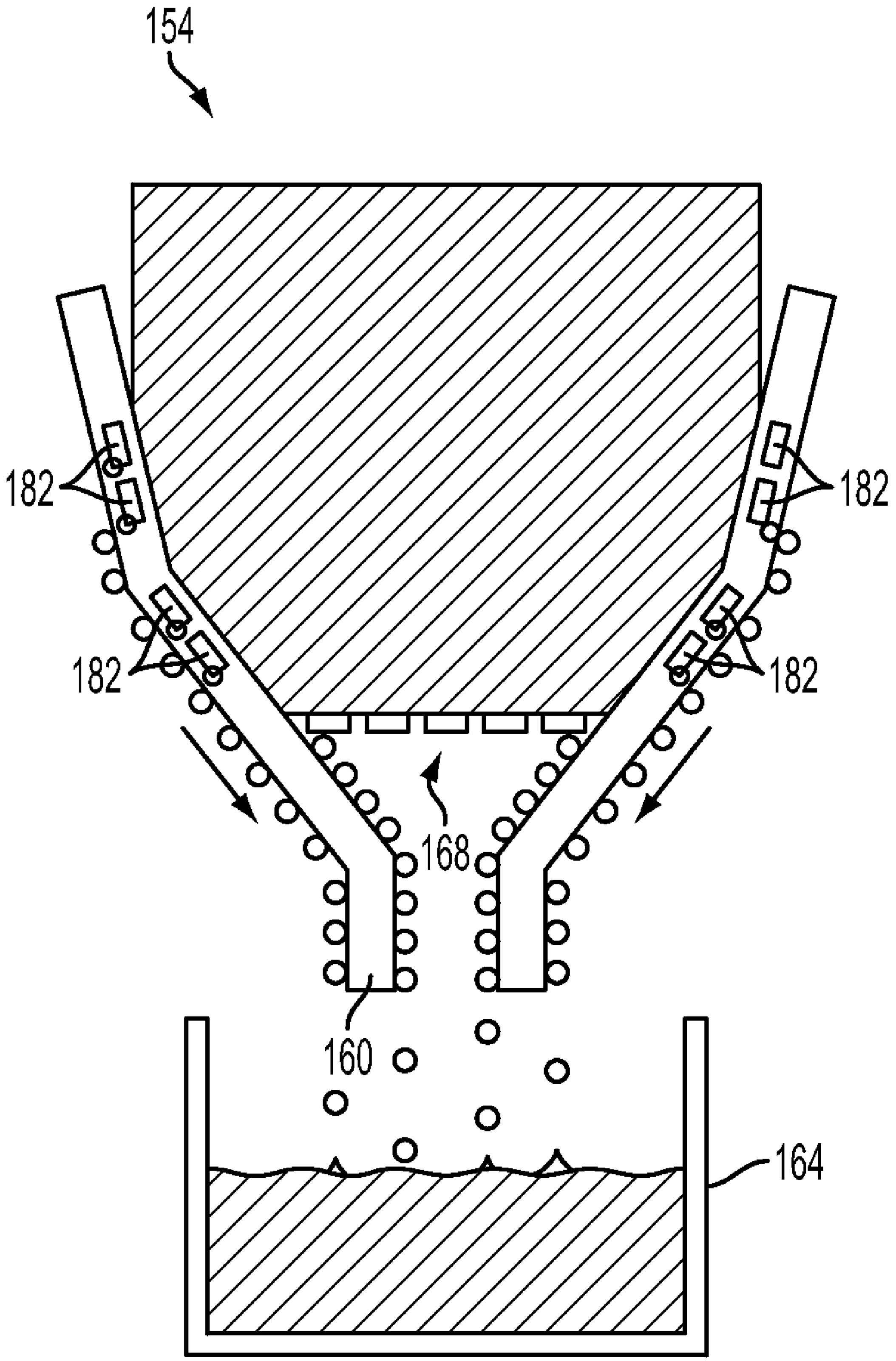
FIG. 9 is a schematic diagram of an alternative embodiment of a melting assembly that may be utilized in the imaging device of FIG. 1.

FIG. 9 shows a schematic illustration of an embodiment of a perimetric constraint having interior flow paths through and around an internal solid ink barrier 168 as well as exterior melted ink flow paths, via the interior-to-exterior flow path openings 182, are provided in the perimetric constraint 154. In the embodiment of FIG. 9, the interior-to-exterior flow path openings are in the form of perforations through the walls of the perimetric constraint. The egress point 160 of the perimetric constraint is configured to direct melted ink from both the internal and external flow paths to a melted ink receptacle 164. The receptacle 164 may be a separate or independent melted ink reservoir that supplies the melted ink to one or more printheads as needed. Alternatively, the receptacle may be integrated into a printhead or may be intimately associated with a printhead.

The ink melt perimetric constraint and the solid ink barrier are formed of the same or different materials, preferably thermally conductive, and may be metallic, ceramic, high temperature plastic or any suitable material that can withstand phase change ink melting temperatures and the low feed force or impacts of the ink sticks. A multi-plate melt perimetric constraint assemblage may be created by adjoining two or more formed plates tapering to the semi-confined ink egress location. The plates may be assembled by welding, fastened tabs, or any other suitable method or device. In embodiments in which the melter perimetric constraint is formed as a single part, the perimetric constraint may be created in multiple ways, as example, by deep drawing, molding the full shape or by bringing the ends of a plate sheet together.

The melting assembly 154 includes a heating system 200 for heating the melter perimetric constraint 154, and if present, a perforated ink barrier 168, to a level capable of melting solid phase change ink. Heating the perimetric constraint and any incorporated ribs or barrier, including a ribbed barrier configuration, and reservoir or reservoirs may be by one heater or multiple heaters. Heating technology, manufacturability, integration or relationship of units and cost effectiveness will determine the heater form and also the number of separate heating elements that may be appropriate for a given configuration and performance objective. Heating technologies that may be employed include, as examples, adhered thick film resistive traces, silicone, polyamide film or similar bonded heaters, molding heater elements into the perimetric constraint and/or ribs and/or barrier, forming the melting assembly from a conductive heater material such as ceramic PTC or sputtering the surface with conductive heater material. Isolating resistance coatings or layers may be used prior to applying heater films or traces on electrically conductive materials and may likewise be used as an overcoat to provide electrical insulation as may be required for component isolation and safety. Positive temperature coefficient (PTC) materials and externally applied traces or coatings may also be utilized.

The temperature at which the ink melting assembly is set to be heated may depend upon the solid ink formulation used. In one embodiment, the heater 200 is configured to generate enough heat to maintain ink in the melter assembly within a temperature range of about 100 degrees Celsius to about 140 degrees Celsius. The heater 200 may also be configured to generate heat in other temperature ranges as appropriate to the material being melted. Separate heaters with independent heat performance or circuits may be used for the perimetric constraint, any barrier or rib configuration and/or reservoir so that each may be heated to a different level.

As depicted in FIG. 5, the egress 160 of the melt perimetric constraint 154 and the reservoir 164 are positioned with respect to each other so that melted ink that exits the egress 160 is received in a melted ink receptacle 164. As mentioned, the receptacle may be a melted ink reservoir that supplies the melted ink to one or more printheads as needed.

Total heated mass of the perimetric constraint melting assembly influences both the time it takes to achieve melting temperature when the heaters are turned on and to achieve melted ink flow stoppage or cessation when the heaters are powered down. Accordingly, warm up times and reaching a ready state under varying circumstances can be adversely affected by a high mass assembly. Similarly, melted ink flow cessation would ideally occur exactly when the melt heaters are powered down. Due to the mass of melt assembly and the heat energy which may have been put into the solid ink at power down, some continued melting does occur. Control of melt mass associated with a melt cycle thus influences reservoir sizing, which needs to be sufficiently large to accommodate post power down melt volume.

A rapid flow cessation function may also be addressed with the perimetric constraint ink melt assembly of the present disclosure by selectively using thickness geometry to encourage cool down of melt surfaces near the exit location. Accordingly, in one embodiment, the perimetric constraint walls 198 adjacent the egress of the melter may be thinner and/or contain greater perforated area than the perimetric constraint walls of the upper portion of the melter. As the thin film of molten ink solidifies it blocks off or inhibits flow that may still be produced from melt regions above, particularly configurations with greater mass such as those with melt ribs or barrier grids. The bonus in reheating when additional melted ink is demanded is that this low mass area will heat more easily, quickly initiating ink replenishment. As an alternative to the selective use of constraint wall thickness to provide a melted ink flow cessation function, a flow stopping function may be addressed with the perimetric constraint by providing the tub with an operable valve or stopper (not shown) to quickly stop the ink flow if rapid flow initiation and/or cessation is required by the application. The stopper may be cycled to open and close as needed.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A phase change ink melting assembly for use in a phase change ink imaging device, the assembly comprising:

a perimetric constraint having an open top and a melted ink egress positioned at a bottom of the perimetric constraint, the open top being sized to receive a leading end of an ink stick fed downwardly therethrough;

a plurality of melted ink flow paths extending from proximate the open top of the perimetric constraint to the egress of the perimetric constraint and;

the plurality of flow paths including interior surfaces established through openings intermediate the open top and egress and through a perforated barrier internal to the perimetric constraint intermediate the open top and egress;

at least one interior-to-exterior path extending from an interior of the perimetric constraint to an exterior of the perimetric constraint through a wall of the perimetric constraint; and a heater for heating the perimetric constraint to a phase change ink melting temperature.

2. The assembly of claim 1, further comprising:

a reservoir configured to receive melted ink via the melted ink egress, the reservoir including a heater for heating the reservoir to the phase change ink melting temperature.

3. The assembly of claim 1, further comprising:

a feed channel having a melt end positioned proximate the open top of the perimetric constraint, the feed channel being configured to sequentially direct solid ink sticks toward the open top of the perimetric constraint.

4. The assembly of claim 3, the feed channel including a keyed insertion opening through which ink sticks may be inserted into the feed channel.

5. The assembly of claim 1, the flow path openings from interior to exterior being at least partial length slots at the corners of a multi-faceted perimetric constraint.

6. The assembly of claim 1, the phase change ink melting temperature being between approximately 100° C. and 140° C.

7. The assembly of claim 1, the open top of the perimetric constraint having a cross-sectional shape at least partially complementary to a perimeter shape of accommodated ink sticks.

8. The assembly of claim 1, the perforations of a melt barrier intermediate the open top and the egress being in the form of grate or grid slots angled from zero to ninety degrees relative to the ink feed vector.

9. A phase change ink handling system comprising:

at least one solid ink feed channel having an insertion end and a melt end, the solid ink feed channel being configured to move solid ink sticks from the insertion end to the melt end;

a solid ink melting assembly for each solid ink feed channel, each solid ink melting assembly including a perimetric constraint having an open top, a melted ink egress positioned at a bottom of the perimetric constraint, and a plurality of melted ink flow paths extending from proximate the open top of the perimetric constraint to the egress of the perimetric constraint , the plurality of flow paths include interior surfaces established through openings intermediate the open top and egress and through a perforated barrier internal to the perimetric constraint intermediate the open top and egress, and at least one interior-to-exterior path extending from an interior of the perimetric constraint to an exterior of the perimetric constraint through a wall of the perimetric constraint, the solid ink melting assembly including a heater for heating the perimetric constraint to a phase change ink melting temperature.

10. The system of claim 9, each solid ink melting assembly further comprising:

a reservoir configured to receive melted ink via the perimetric constraint melted ink egress, the reservoir including a heater for heating the reservoir to the phase change ink melting temperature.

11. The system of claim 10, the reservoir receiving melted ink from the perimetric constraint being a reservoir integrated with a printhead.

12. The system of claim 9, the at least one feed channel further comprising:

four feed channels, each feed channel being associated with a different color of ink and having an insertion opening shaped to at least partially complement a shape of accommodated ink sticks.

13. The system of claim 9, the phase change ink melting temperature being between approximately 100° C. and 140° C.

14. The system of claim 9, the flow path openings from interior to exterior being perforations through the wall of the perimetric constraint.

15. The system of claim 9, the perforations of a melt barrier intermediate the open top and the egress being in the form of grate or grid slots angled from zero to ninety degrees relative to the ink feed vector.

16. A phase change ink imaging device including:

a plurality of solid ink feed channels, each feed channel in the plurality being configured to move ink sticks toward a melt end of the feed channel;

a solid ink melting assembly for each solid ink feed channel in the plurality, each solid ink melting assembly including a perimetric constraint having an open top, a melted ink egress positioned at a bottom of the perimetric constraint, and a plurality of melted ink flow paths extending from proximate the open top of the perimetric constraint to the egress of the perimetric constraint , the plurality of flow paths include interior surfaces established through openings intermediate the open top and egress and through a perforated barrier internal to the perimetric constraint intermediate the open top and egress, and at least one interior-to-exterior path extending from an interior of the perimetric constraint to an exterior of the perimetric constraint through a wall of the perimetric constraint, the solid ink melting assembly including a heater for heating the perimetric constraint to a phase change ink melting temperature;

a reservoir for each ink melting assembly, each reservoir being configured to receive melted ink via the melted ink egress of one of the ink melting assemblies, the reservoir including a heater for heating the reservoir to the phase change ink melting temperature; and at least one printhead configured to receive melted ink from at least one of the reservoirs and to eject melted phase change ink onto an imaging surface.

17. The device of claim 16, each feed channel in the plurality including a keyed insertion opening.

18. The device of claim 16, the phase change ink melting temperature being between approximately 100° C. and 140° C.

19. The device of claim 16, the open top of the perimetric constraints having a shape at least partially complementary to a perimeter shape of accommodated ink sticks.

20. The device of claim 16, the perforations of a melt barrier intermediate the open top and the egress being in the form of grate or grid slots angled from zero to ninety degrees relative to the ink feed vector.

* * * * *